(12) United States Patent
Sherman et al.

(10) Patent No.: US 11,901,715 B2
(45) Date of Patent: Feb. 13, 2024

(54) JUNCTION BOX ASSEMBLY

(71) Applicant: Allied Tube & Conduit Corporation, Harvey, IL (US)

(72) Inventors: Justine Sherman, Weatherford, TX (US); Debra Dersham, Springfield, OR (US); Andrew Silberhorn, Weatherford, TX (US); James Gilchrist, Weatherford, TX (US)

(73) Assignee: Allied Tube & Conduit Corporation, Harvey, IL (US)

( * ) Notice: Subject to any disclaimer, the term of this patent is extended or adjusted under 35 U.S.C. 154(b) by 129 days.

(21) Appl. No.: 17/689,629

(22) Filed: Mar. 8, 2022

(65) Prior Publication Data
US 2023/0291189 A1  Sep. 14, 2023

(51) Int. Cl.
*H02G 3/08* (2006.01)
*H02G 3/12* (2006.01)

(52) U.S. Cl.
CPC ............. *H02G 3/081* (2013.01); *H02G 3/125* (2013.01)

(58) Field of Classification Search
CPC ............ H02G 3/08; H02G 3/081; H02G 3/14; H02G 3/085; H02G 3/088; H02G 3/10; H02G 3/12; H05K 5/00; H05K 5/02; H05K 5/0004; H05K 5/0204; H05K 5/0217; H05K 5/03

USPC ................. 174/480, 481, 50, 53, 57, 66, 67; 220/3.2–3.8, 4.02, 241, 242; 248/906; 439/535, 536

See application file for complete search history.

(56) References Cited

U.S. PATENT DOCUMENTS

| | | | | |
|---|---|---|---|---|
| 6,831,227 B2 * | 12/2004 | Weise | ............. | H02G 3/086 |
| | | | | 439/535 |
| 7,105,745 B2 * | 9/2006 | Drane | ............. | H02G 3/14 |
| | | | | 174/67 |
| 7,504,580 B2 * | 3/2009 | Lammens, Jr. | ............. | H02G 3/14 |
| | | | | 439/535 |
| 7,855,338 B2 * | 12/2010 | Troder | ............. | H02G 3/10 |
| | | | | 174/64 |
| 7,910,826 B1 * | 3/2011 | Shotey | ............. | H02G 3/086 |
| | | | | 174/64 |
| 8,013,245 B2 * | 9/2011 | Korcz | ............. | H02G 3/081 |
| | | | | 174/67 |
| 11,489,322 B2 * | 11/2022 | Wen | ............. | H02G 3/085 |
| 11,515,693 B2 * | 11/2022 | Wade | ............. | H02G 3/081 |
| 11,710,953 B2 * | 7/2023 | Smith | ............. | H02G 3/0493 |
| | | | | 174/67 |

* cited by examiner

Primary Examiner — Angel R Estrada
(74) Attorney, Agent, or Firm — KDW FIRM PLLC (57) ABSTRACT

A junction box assembly includes a cover and a junction box. The cover has a first captive screw in a first screw hole and a second captive screw in a second screw hole. The junction box has a slot to temporarily store the cover.

19 Claims, 9 Drawing Sheets

JUNCTION BOX ASSEMBLY

FIELD OF THE DISCLOSURE

Embodiments of the present disclosure relate to junction boxes and, more particularly, to a junction box configuration.

BACKGROUND

Junction boxes are enclosures that house electrical connections to be joined at an intersection. Junction boxes protect the electrical connections from weather or other environmental conditions and protect individuals from electrical shock. Made from metal, such as aluminum, steel, or cast iron, or from thermoplastics, such as polyvinyl chloride or polycarbonate, junction boxes may include features like built-in terminals or ingress protection against water or dust.

Junction boxes are installed in locations that are accessible during maintenance. The typical junction box includes loose elements, such as covers, screws, and gaskets. Wiring the junction box is a time-consuming process which may take days or weeks as well as the involvement of different contractors. During the installation, the loose elements may become lost, rendering the junction box useless. The loose elements or possibly even the entire junction box must then be replaced, a waste of time and money for the installation project.

Further, junction boxes made of thermoplastics can warp over time. This is particularly true in warmer climates or when the junction box is installed against a metal surface, such as the siding of a building. A worn junction box may expose wiring, creating electrical hazards which can result in dangers such as fire or electrical shock.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a junction box assembly in accordance with the present disclosure may include a cover and a junction box. The cover has a first captive screw in a first screw hole and a second captive screw in a second screw hole. The junction box has a slot to temporarily store the cover.

Another exemplary embodiment of a junction box assembly in accordance with the present disclosure may include a junction box and a cover. The junction box has two mounting feet, each having grooves. The cover is temporarily located between the two grooves. The cover has a first pair of captive screws to be removed during attachment of the cover to the junction box and a second pair of captive screws that are not removed during attachment of the cover to the junction box.

An exemplary embodiment of junction box assembly in accordance with the present disclosure may include a cover and a junction box. The cover has a gasket groove with a predefined shape. The junction box has a slot located between a pair of mounting feet, with the slot being a temporary location for storing the cover. The junction box also has a raised perimeter edge portion having the same predefined shape as the gasket groove. The gasket groove mates with the perimeter edge portion.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

A junction box assembly including a cover and a junction box is disclosed. The junction box has a slot that enables temporary storage of the cover. Four captive screws disposed in the cover do not move from their screw holes easily. Two of the four captive screws are removed upon affixation of the cover onto the junction box following installation of internal components. The remaining two captive screws are not removed but are tightened into threaded inserts of the junction box. The cover includes a gasket groove that matches the shape of a raised perimeter edge portion of the junction box. Once the cover is secured to the junction box, the empty slot provides airflow between the junction box and a mounting surface, protecting the junction box assembly from undue heat and prolonging its useful life.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1:
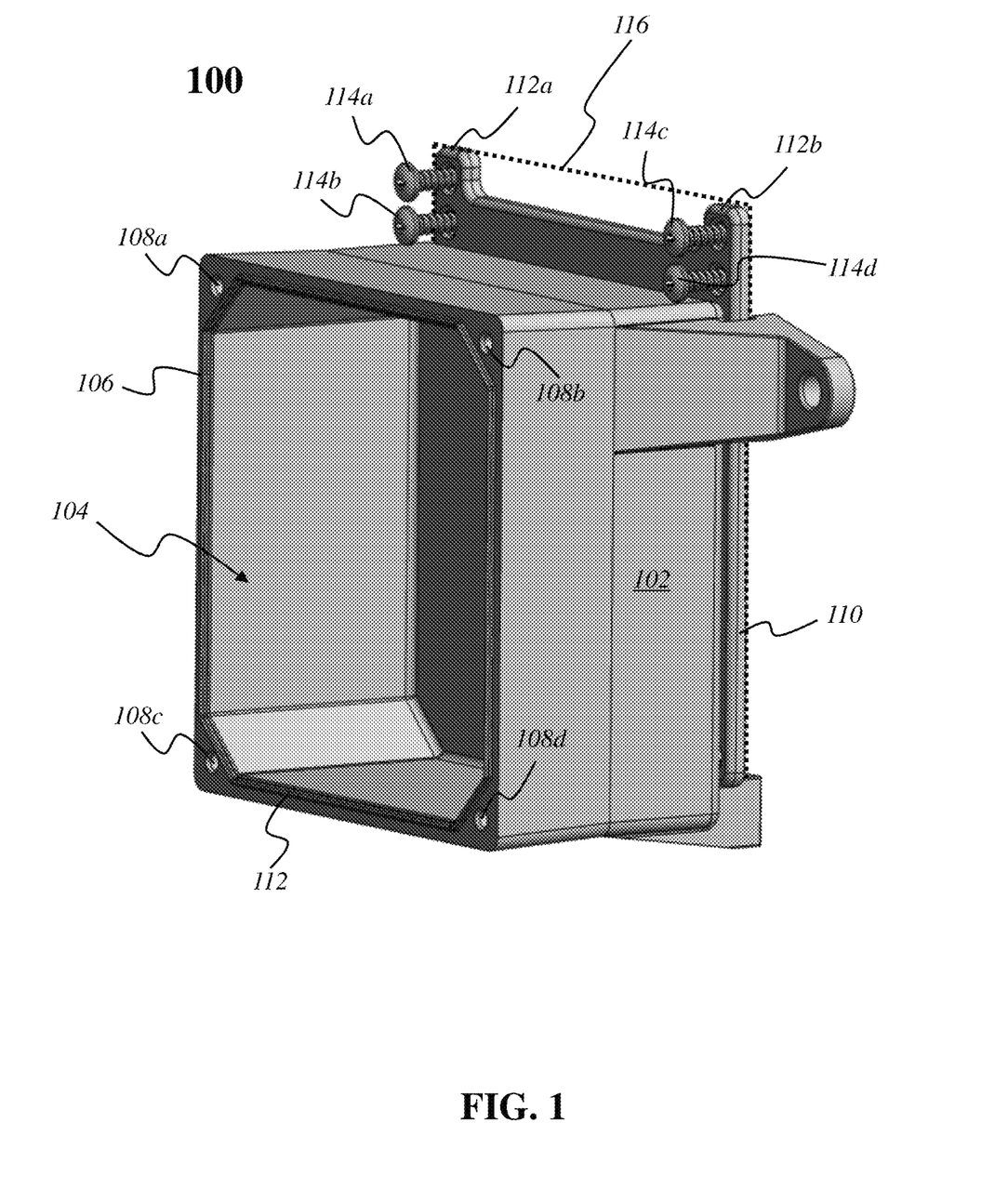
FIG. 1 is an isometric view of a junction box assembly, in accordance with exemplary embodiments.

FIG. 1 is a representative drawing of a junction box assembly 100, according to exemplary embodiments. The junction box assembly 100 features a junction box 102 and a cover 110, with the cover being disposed in a slot 116. In exemplary embodiments, the cover 110 remains in the slot 116 until the junction box 102 is to be sealed/closed. The slot 116 thus serves as a temporary location for the cover 110 during transport and installation of the junction box 102.

The junction box 102 has an opening 104 that enables access to contents such as wires, cables, and/or terminals to be joined within the junction box assembly 100. Contractors typically cut holes as needed to feed cables through the junction box. For this reason, the junction box 102 is not precut with holes. The cover 110 is used to create a closed structure for housing the contents within the junction box 102. The junction box 102 may include apertures through which the wires or cables are disposed (not shown). Although the junction box 102 is shown as a rectangular cube shape, the junction box may assume any of a variety of shapes and sizes, limited only by the ability to secure electrical connections at an intersection location between two or more wires or cables. In exemplary embodiments, the cover 110 is removable from the slot 116 to be placed over the opening 104 of the junction box 102 once the contents inside the junction box have been secured.

A raised perimeter edge portion 106 surrounds the opening 104 of the junction box 102 and is adjacent to threaded bores 108a-d disposed at corners of the junction box (collectively, "threaded bores 108"). In exemplary embodiments, the raised perimeter edge portion 106 has a predefined shape designed to receive a similarly shaped element of the cover 110 to both align and mate the junction box 102 with the cover, thus forming a tight seal therebetween. The cover 110 is shown and described in more detail in FIG. 3.

The threaded bores 108 are sized to receive captive screws 114a-d of the cover 110 (collectively, "captive screws 114"). Protrusions 112a-b are disposed at one end of the cover 110 (collectively, "protrusions 112"). The screws 114 are described herein as "captive" because they are provisionally set into respective threaded screw holes of the cover 110 and do not fall out of the screw holes unless rotated, such as with a screw driver. Captive screws 114a and 114c are provisionally set in protrusions 112a and 112b, respectively, with captive screw 114b being adjacent to captive screw 114a and captive screw 114d being adjacent to captive screw 114d. Although removable from the cover 110, in exemplary embodiments, the captive screws 114 are designed to stay in place as illustrated in FIG. 1 until the cover is to be placed over the opening 104 of the junction box 102. Thus, neither the cover 110 nor the captive screws 114 are likely to be lost during installation of the junction box assembly 100.

In exemplary embodiments, in conjunction with the cover 110 being removed from the slot 116 and placed over the opening 104 of the junction box 102, the captive screws 114a and 114c are removed from the cover for insertion into the threaded bores 108c and 108d of the junction box. Thus, in exemplary embodiments, the captive screws 114b and 114d are not removed, but are simply screwed into the threaded bores 108a and 108b. The placement of the captive screws 114 is described in more detail in FIG. 3.

In exemplary embodiments, the junction box assembly 100 is made of a thermoplastic material, such as polyvinyl chloride (PVC). The junction box assembly 100 allows for the cover 110 to be slipped into the slot 116 on the backside of the junction box 102 where the cover resides out of the way until the contents of the junction box are to be secured. In exemplary embodiments, the junction box assembly 100 is delivered with the cover 110 disposed in the slot 116 and the four captive screws 114 already provisionally set in the cover, which is holstered in place on the backside of the junction box 102.

FIGS. 2A-2D are representative drawings of the junction box 102 used by the junction box assembly 100 of FIG. 1, according to exemplary embodiments. The figures provide several perspective views of the junction box 102 without the cover 110 installed. The junction box 102 includes mounting foot 202a, mounting foot 202b, support foot 212a, and support foot 212b (collectively, "mounting feet 202" and "support feet 212"). The mounting feet 202 are located at one end of the junction box 102, with mounting foot 202a being on an opposing side to mounting foot 202b. The support feet 212 are located at a second end of the junction box 102, opposite the mounting feet 202, with support foot 212a being on an opposing side to the support foot 212b. The mounting feet 202 enable connection of the junction box 102 to an attachment surface, such as to the side of a post, a wall, or a building, while the support feet 212 provide additional support as the junction box 102 is disposed against the attachment surface.

The mounting foot 202a includes a box attach portion 204a, a surface attach portion 206a, a groove 208a, and an aperture 210a; similarly, mounting foot 202b includes a box attach portion 204b, a surface attach portion 206b, a groove 208b, and an aperture 210b (collectively, "box attach portions 204", "surface attach portions 206", "grooves 208", and "apertures 210"). The box attach portions 204 are connected to the junction box 102 while the surface attach portions 206 are orthogonal to respective box attach portions. Although shaped like a trapezoid or rounded triangle, the surface attach portions 206 may assume any of a variety of shapes for accommodating respective apertures 210. Sized to accommodate fasteners such as bolts, screws, or nails, the apertures 210 enable the junction box assembly 100 to be mounted to a surface, such as a wall or unistrut. The apertures may be threaded or unthreaded, depending on the type of fasteners used to secure them to the surface. The surface attach portions 206 are also flat on one side so that, once the junction box assembly 100 is mounted to the attachment surface, the surface attach portions 206 will be disposed flush against the surface.

The support foot 212a includes a box attach portion 214a, a surface adjacent portion 216a, and a ridge 218a; similarly, support foot 212b includes a box attach portion 214b, a surface adjacent portion 216b, and a ridge 218b (collectively, "box attach portions 214", "surface adjacent portions 216", and "ridges 218"). The box attach portions 214 are connected to the junction box 102 while the surface adjacent portions 216 are orthogonal to the respective box attach portions. Once the mounting feet 202 are affixed to the intended location of the junction box assembly 100, the surface adjacent portions 216 of the support feet 212 will rest against the attachment surface, in some embodiments. It will be appreciated that although the support feet 212a, 212b are described as being "attached" to the junction box 102, the support feet are integrally formed with the junction box such as through injection molding, machining, or the like.

In exemplary embodiments, the surface attach portion 206 of each mounting foot 202a, b is disposed orthogonally with respect to the box attach portion 204 such that one end of each surface attach portion extends inwardly past the box attach portion 204. This arrangement forms the grooves 208 between opposing surfaces of the junction box 102 and the surface attach portions 206 that make up a portion of the slot 116. Similarly, the surface adjacent portion 216 of each support foot 212 is disposed orthogonally on the box attach portion 214 such that one end of each surface adjacent portion extends inwardly past the box attach portion 204, leaving the ridges 218 that make up a portion of the slot 116.

Figure 2A:
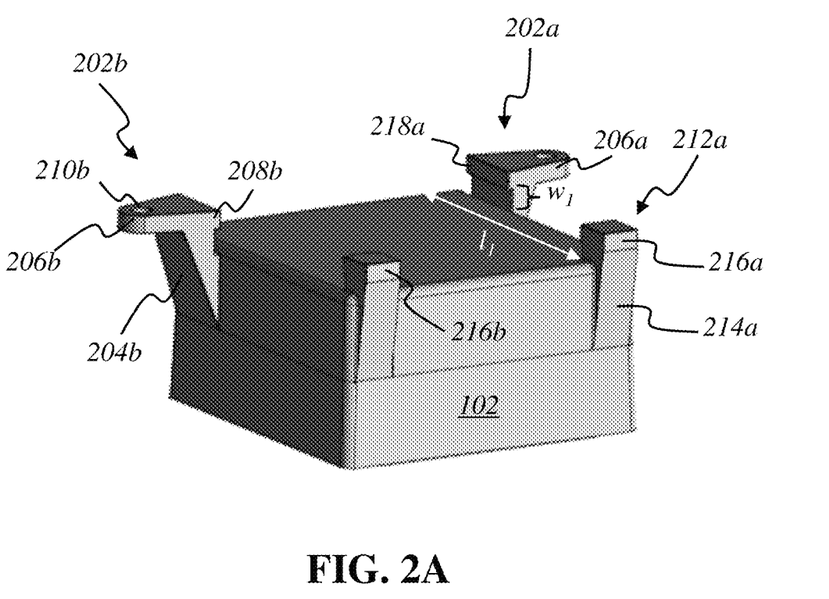
FIGS. 2A-2D are isometric views of a junction box portion of the junction box assembly of FIG. 1, in accordance with exemplary embodiments.
Figure 2B:
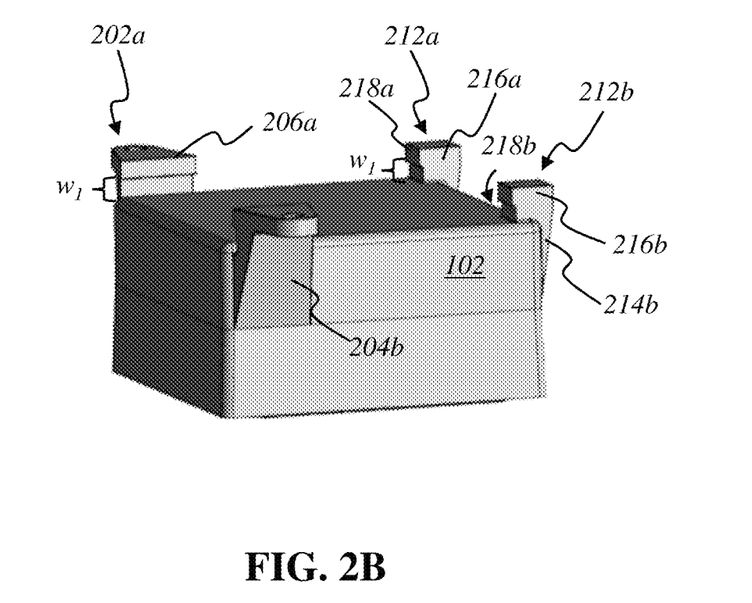
Figure 2C:
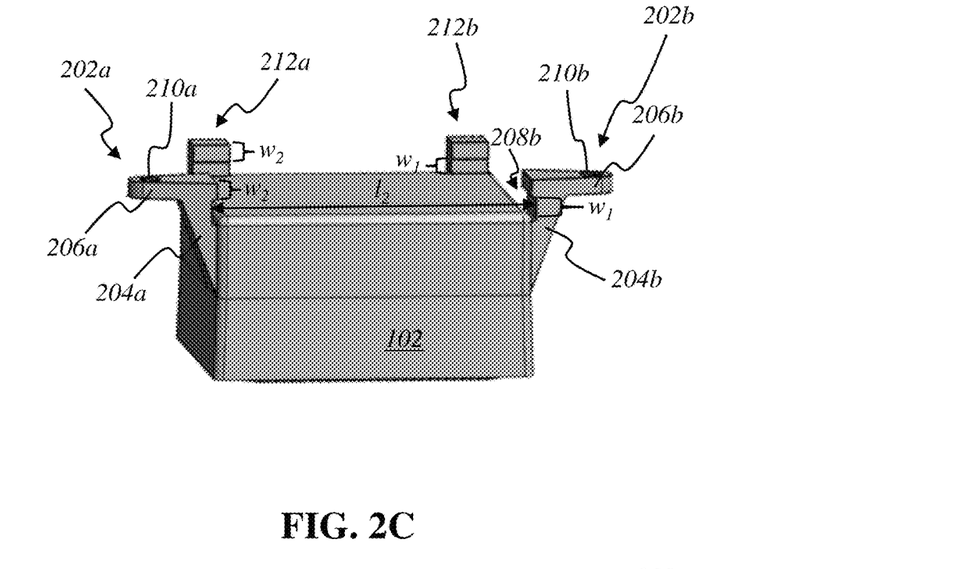
Figure 2D:
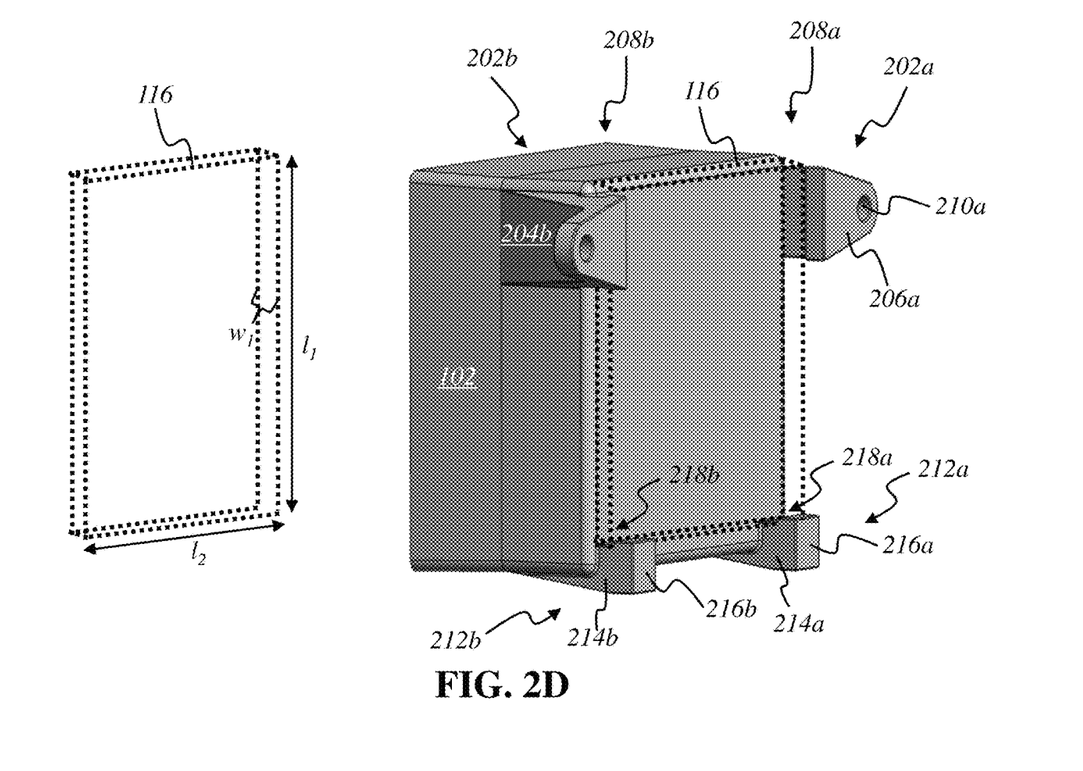

FIG. 2D shows an outline of the slot 116, which is formed by groove 208a, groove 208b, ridge 218a, and ridge 218b.

In exemplary embodiments, the cover 110 is inserted into the slot 116 until a bottom portion of the cover is "stopped" by the ridges 218. The cover 110 thus rests on the ridges 218. The cover 110 is longer than the slot 116, leaving room for the provisionally set captive screws 114 to extend above the junction box 102, as illustrated in FIG. 1. In exemplary embodiments, the grooves 208 and ridges 218 are c-shaped such that the rounded surfaces of the cover 110 fit snugly against the grooves and ridges.

In exemplary embodiments, the grooves 208 and the ridges 218 have a width, $w_1$, the length between a mounting foot 202 and a support foot 212 is $l_1$, and the length between the two mounting feet is $l_2$. Thus, the slot 116 is a rectangular cube of dimensions $w_1 \times l_1 \times l_2$. The dimensions are shown variously in FIGS. 2A-2C, with the slot 116 being reproduced next to the junction box 102 in FIG. 2D. In exemplary embodiments, the dimensions of the slot 116 are slightly larger than the dimensions of the cover 110, thus allowing the cover to be inserted into and removed from the slot without difficulty, yet fitting snugly within the slot.

Further, the surface attach portions 206 of the mounting feet 202 and the surface adjacent portions 216 of the support feet 212 have a width, $w_2$. Thus, the mounting feet 202 and the support feet 212 protrude out from the junction box 102 by a predetermined distance given by $w_1+w_2$, with $w_1$ being the width of the slot 116. In exemplary embodiments, the predetermined distance ensures that there is airflow between the junction box 102 and the mounting surface once the cover 110 is removed from the slot 116 and attached to the opening 104 of the junction box. The spacing between the junction box 102 and the mounting surface further enables easy cleaning and helps keep the junction box cool, which reduces warping effects and extends the life of the junction box, in exemplary embodiments. Although the width, $w_1$, is somewhat based on the width of the cover 110, the width, $w_2$, is not. Thus, in exemplary embodiments, the width, $w_2$, is adjustable to accommodate certain environments, such as when the junction box assembly 100 is to be mounted on a surface that receives an abundance of sunlight, is located near an oven that produces high heat, and so on.

The slot 116 therefore has a dual purpose: to temporarily house the cover 110 during installation of the contents of the junction box assembly 100 and to provide a space between the junction box 102 and the mounting surface once the junction box is attached to the surface. Because junction boxes, particularly those made of thermoplastic, are sensitive to heat, the slot 116, in addition to the width of the surface attach portions 206 and surface adjacent portions 216 (e.g., width $w_2$) provides spacing between the junction box assembly 100 and its mounting surfaces. In exemplary embodiments, the width, $w_1+w_2$ of the junction box assembly 100 is between 7/16 and 1 inch.

In exemplary embodiments, the junction box assembly 100 is made using a thermoplastic material such as polyvinyl chloride (PVC), with the junction box 102, the mounting feet 202, and the support feet 212 formed as a unitary structure, such as by injecting the PVC material (in a liquid state) into a mold. In other embodiments, the junction box assembly 100 is made of a metal material, such as aluminum, steel, or cast iron, with the mounting feet 202 and support feet 212 being soldered or otherwise affixed to the junction box 102. The embodiments are not limiting in this regard.

Figure 3:
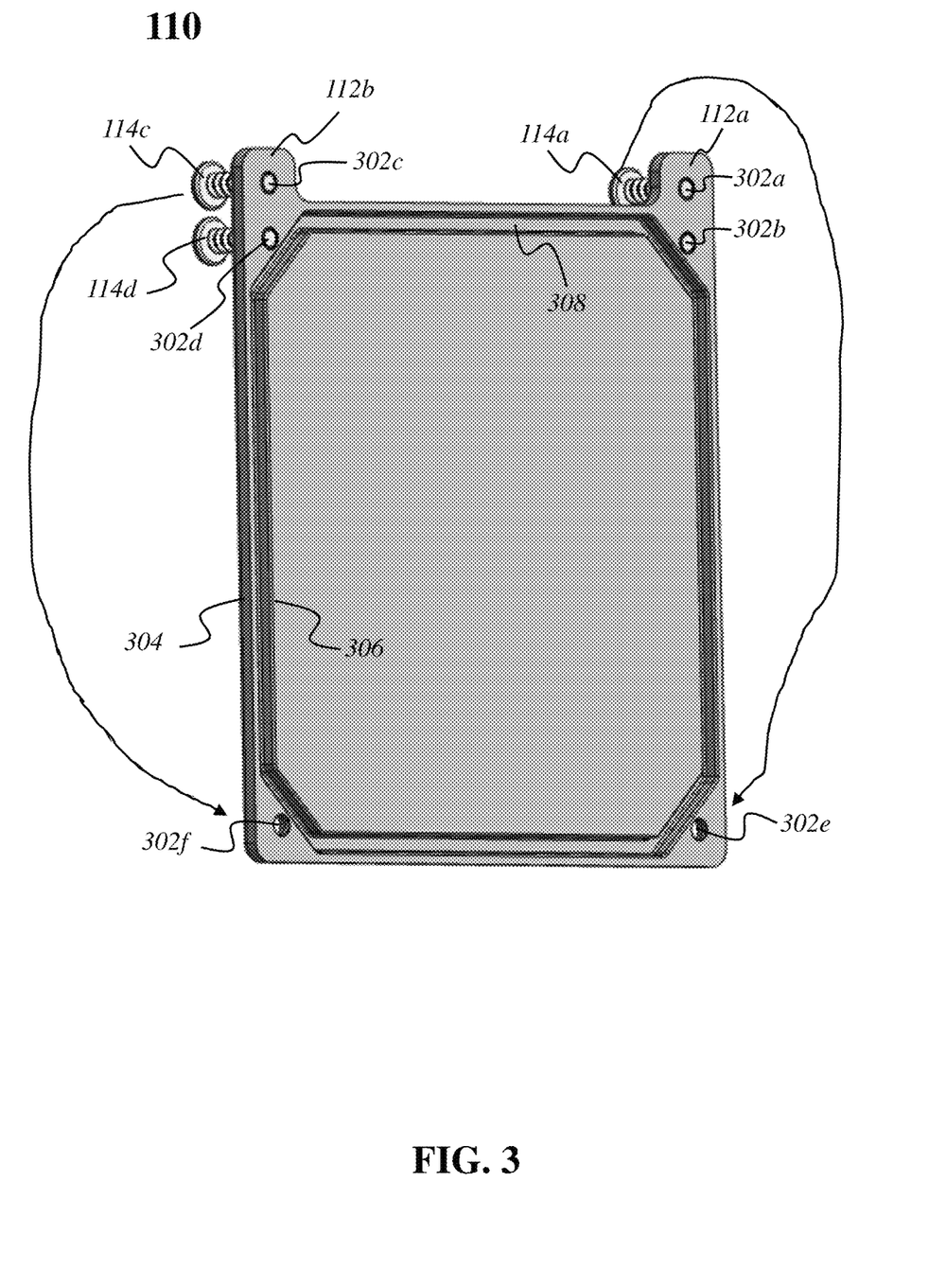
FIG. 3 is an isometric view of a cover portion of the junction box assembly of FIG. 1, in accordance with exemplary embodiments.

FIG. 3 is a representative drawing of the cover 110 of the junction box assembly 100 of FIG. 1, according to exemplary embodiments. In contrast to the view of FIG. 1, a backside view of the cover 110 is shown. The protrusions 112 as well as the captive screws 114 introduced in FIG. 1 are shown. Additionally, the cover 110 features an edge portion 304 and a mating portion 306, with a gasket groove 308 disposed therebetween. Recall that the junction box 102 features a perimeter edge portion 106 (FIG. 1).

Figure 4:
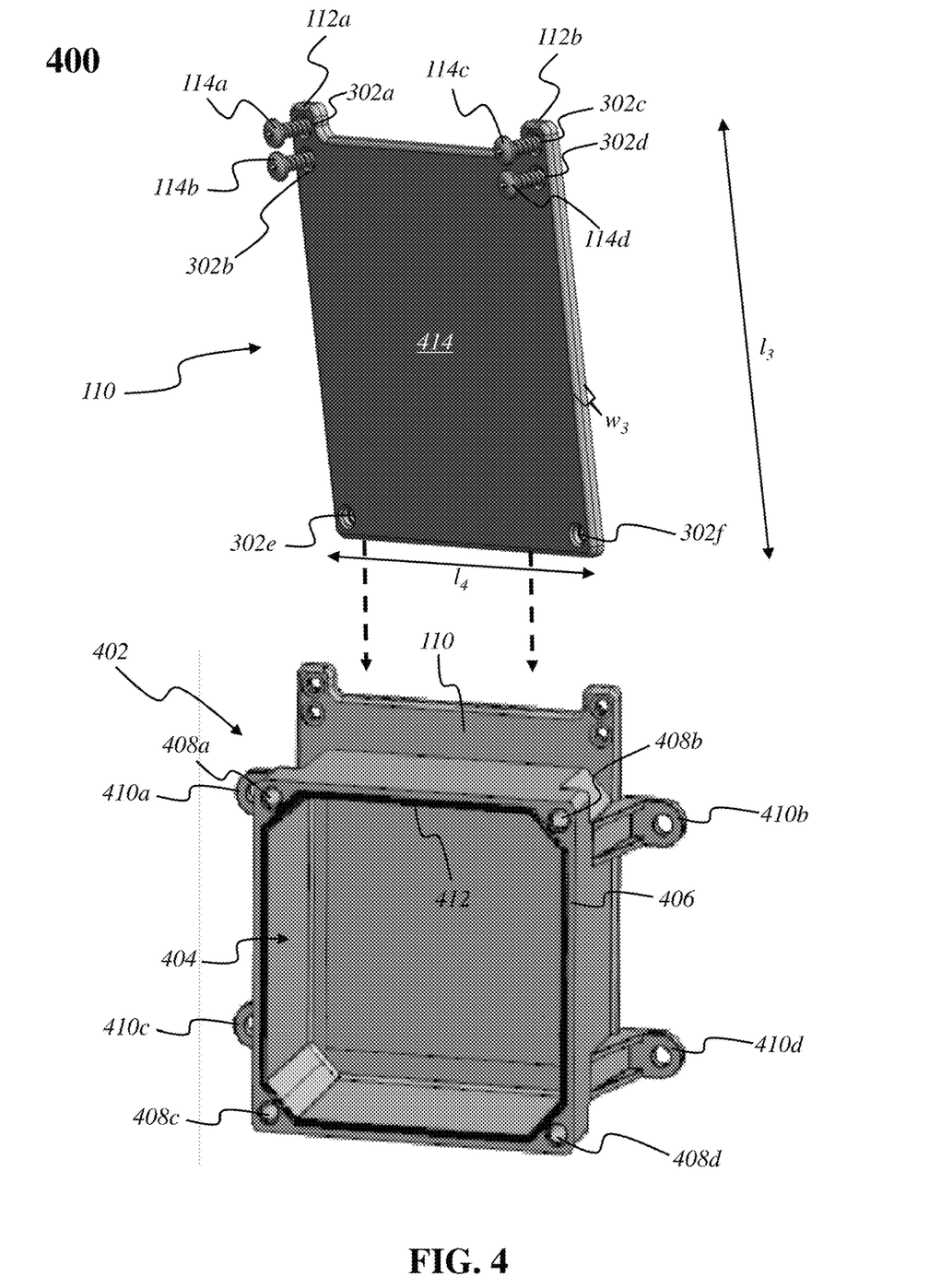
FIG. 4 is an isometric view of the junction box assembly of FIG. 1, with the cover portion separated from the junction box portion, in accordance with exemplary embodiments.

In exemplary embodiments, the gasket groove 308 has the predefined shape of the perimeter edge portion 106, allowing the cover 110 to be seated on the opening 104 of the junction box 102. In exemplary embodiments, the predefined shape is an elongated octagon. However, the perimeter edge portion 106 may have a different predefined shape if the gasket groove 308 also has the predefined shape, allowing the two parts to mate with one another. Further, in exemplary embodiments, the junction box assembly 100 includes an integrated gasket (not shown), which may be permanently inserted into the perimeter edge portion 106 or into the gasket groove 308. This ensures that, once the cover 110 is attached to the junction box 102, an airtight seal is formed, in exemplary embodiments. In some embodiments, the integrated gasket ensures a watertight seal between the cover 110 and the junction box 102. Further, in exemplary embodiments, the integrated gasket prevents misalignment of the cover 110 on the junction box 102. Finally, by integrating the gasket, the possibility of losing the gasket is mitigated, in some embodiments. A gasket integrated into the perimeter edge portion 106 of the junction box 102 is shown in FIG. 4.

The cover 110 also features six screw holes 302a-f (collectively, "screw holes 302"). Screw hole 302a holds captive screw 114a, screw hole 302b holds captive screw 114b (not shown), screw hole 302c holds captive screw 114c, and screw hole 302d holds captive screw 114d. Additionally, screw holes 302e and 302f hold the two captive screws 114a and 114c that are removed from the cover 110 when the cover is to be attached to the junction box 102. In exemplary embodiments, the screw holes 302 are threaded to receive the captive screws 114.

With respect also to FIG. 1, to attach the cover 110 to the junction box 102, captive screw 114b, which is provisionally set in screw hole 302b, remains in screw hole 302b, but the captive screw is then fastened into threaded bore 108a; similarly, captive screw 114d, which is provisionally set in screw hole 302d remains in screw hole 302d, but the captive screw is then fastened into threaded bore 108b. In exemplary embodiments, these operations are performed simply by lining the gasket groove 308 of the cover 110 to the perimeter edge portion 106 of the junction box 102, then fastening the captive screws 114b and 114d into threaded bores 108a and 108b, respectively. Next, the captive screws 114a and 114c are removed from the protrusions 112 of the cover 110, inserted into the screw holes 302e and 302f of the cover 110, and fastened into the threaded bores 108c and 108d of the junction box 102. Once these operations are completed, screw holes 302a and 302c are empty and the protrusions 112 are disposed above a top edge of the junction box 102. Further, in exemplary embodiments, two of the four captive screws, captive screws 114b and 114d, are not removed and are thus less likely to be lost. Of the four captive screws, only captive screws 114a and 114c are to be removed, and these may, upon movement of the cover 110 from the slot 116 to the front of the junction box 102, be moved from screw holes 302a and 302c to screw holes 302e and 302f. In contrast to prior art junction box assemblies in which the screws are loose, the design of the junction box assembly 100 makes loss of the captive screws much less likely, in some embodiments.

Alternatively, because the gasket groove 308 and perimeter edge portion 106 are bilaterally symmetrical, the cover 110 may be attached to the junction box 102 "upside down" from this arrangement, with the captive screws 114b and 114d being inserted into the threaded bores 108d and 108c, respectively, and the removed captive screws 114a and 114c inserted into the screw holes 302e and 302f and fastened into the threaded bores 108a and 108b. With this arrangement, the protrusions 112 would be disposed below a bottom edge of the junction box 102.

FIG. 4 is an exploded view of a junction box assembly 400, according to exemplary embodiments. A new junction box 402, with slight variation from the junction box 102 of FIG. 1 is shown, with the cover 110 as before. Dashed arrows show one of two positions in which the cover 110 may be disposed relative to the junction box, in exemplary embodiments. The cover 110 includes the above-described protrusions 112, the captive screws 114, and the screw holes 302. An outside surface 414 is smooth, in contrast to the opposing surface of the cover 110, which includes the edge portion 304, mating portion 306, and gasket groove 308 (FIG. 3). The outside surface 414 is the visible part of the cover 110 once attached to the junction box 102 (FIG. 1) or the junction box 402 (FIG. 4).

As previously noted, the slot 116 is designed for temporary storage, and the cover 110 is a rectangular cube. The cover 110 dimensions are $w_3 \times l_3 \times l_4$ as shown. In exemplary embodiments, $w_3 < w_1$ and $l_4 < l_2$. In other words, the slot 116 is slightly thicker than the cover 110 and the length of one side of the slot is slightly larger than the length of one side of the cover. This ensures that the cover 110 fits into the slot 116. Because the cover 110 includes the protrusions 112, the length, $l_3$, is slightly larger than the length, $l_1$, of the slot 116.

The junction box 402 includes a raised perimeter edge portion 406, which is the same predefined shape as the perimeter edge portion 106 of the junction box 102. An integrated gasket 412 is disposed along the perimeter edge portion 406 and also has the predefined shape, in some embodiments. In exemplary embodiments, the integrated gasket 412 prevents misalignment between the junction box 402 and the cover 110 and ensures an airtight and/or watertight seal therebetween. Further, by being integrated with the junction box 402, the likelihood of loss of the integrated gasket 412 is minimized, in some embodiments.

The junction box 402 also includes threaded bores 408a-d disposed at corners of the junction box (collectively, "threaded bores 408"). The threaded bores 408 are sized to receive respective captive screws 114 of the cover 110. Where the junction box 102 included two mounting feet 202 (FIGS. 2A-2D), the junction box 402 features four mounting feet 410a-d (collectively, "mounting feet 410"), in exemplary embodiments. The mounting feet 410 enable connection of the junction box 402 to an attachment surface, such as to the side of a post, a wall, or a building. In exemplary embodiments, the mounting feet 410 have features similar to the mounting feet 202 described above.

Figure 5:
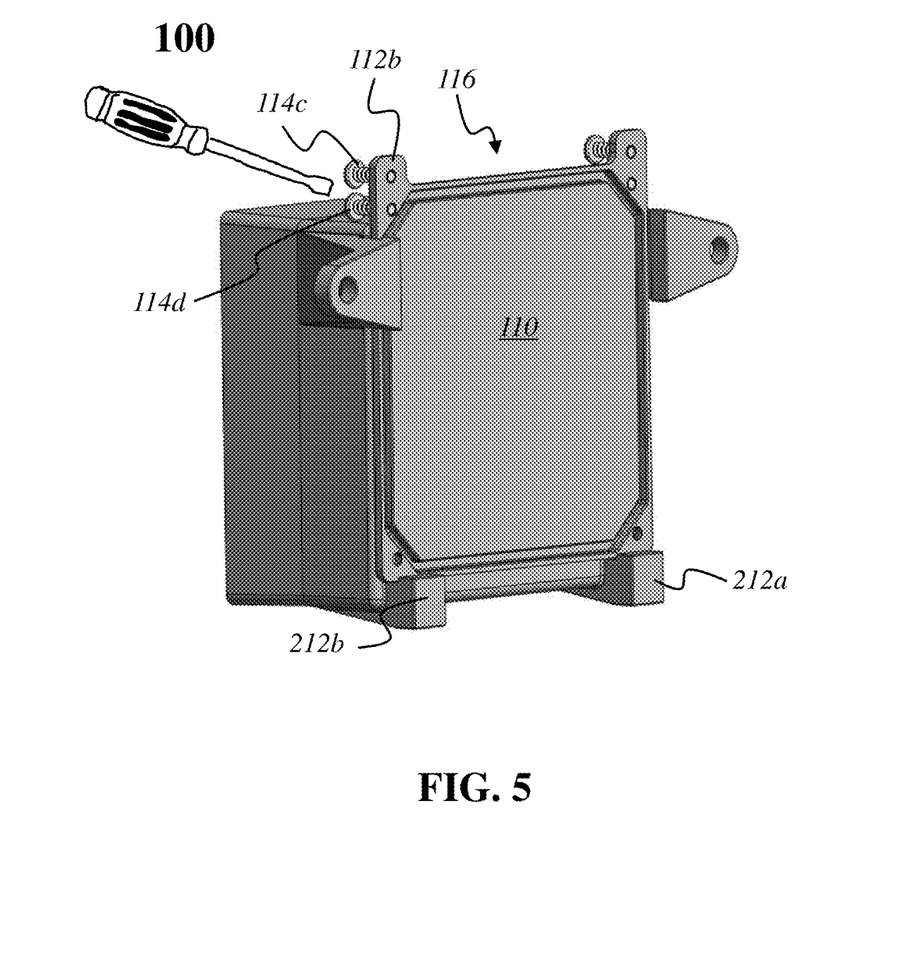
FIG. 5 is an isometric view of the junction box assembly of FIG. 1, in accordance with exemplary embodiments.

FIG. 5 is a perspective view of the junction box assembly 100, according to exemplary embodiments. A backside view of the junction box assembly 100 is shown with the cover 110 disposed in the temporary slot 116 In exemplary embodiments, the cover 110 sits against the support feet 212. The protrusion 112b as well as the provisionally set captive screws 114c and 114d are shown. In exemplary embodiments, the tip of a tool, such as a screwdriver, can be fit between the captive screws 114, thus providing leverage for extraction of the cover 112 from the slot 116.

Figure 6A:
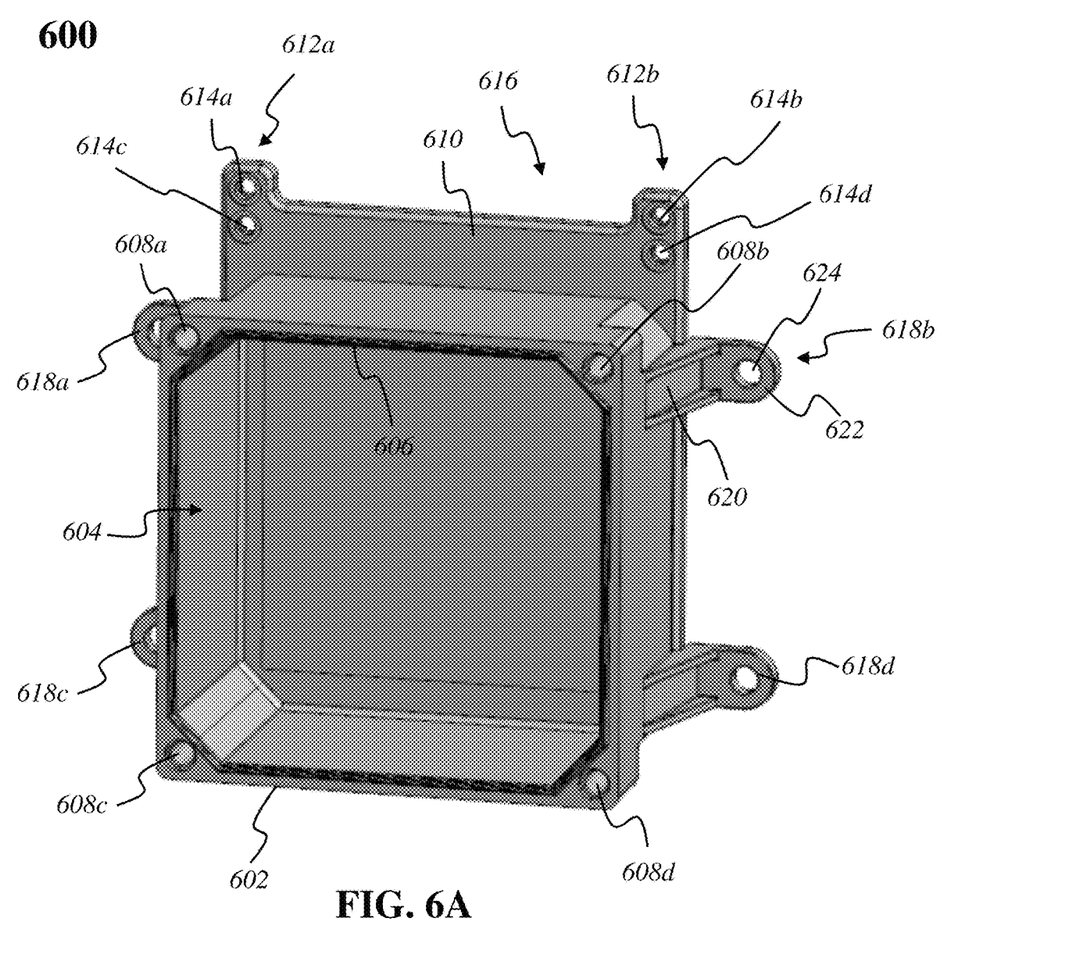
FIGS. 6A-6C are isometric views of a junction box assembly, in accordance with exemplary embodiments.
Figure 6B:
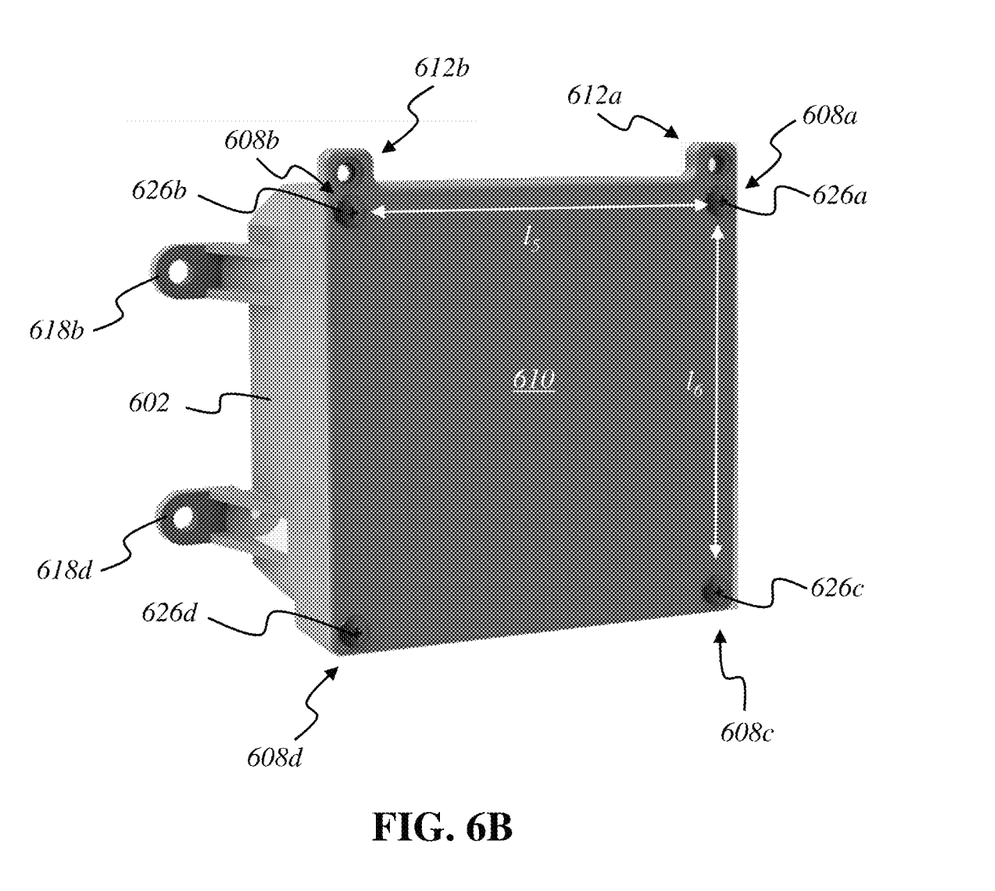
Figure 6C:
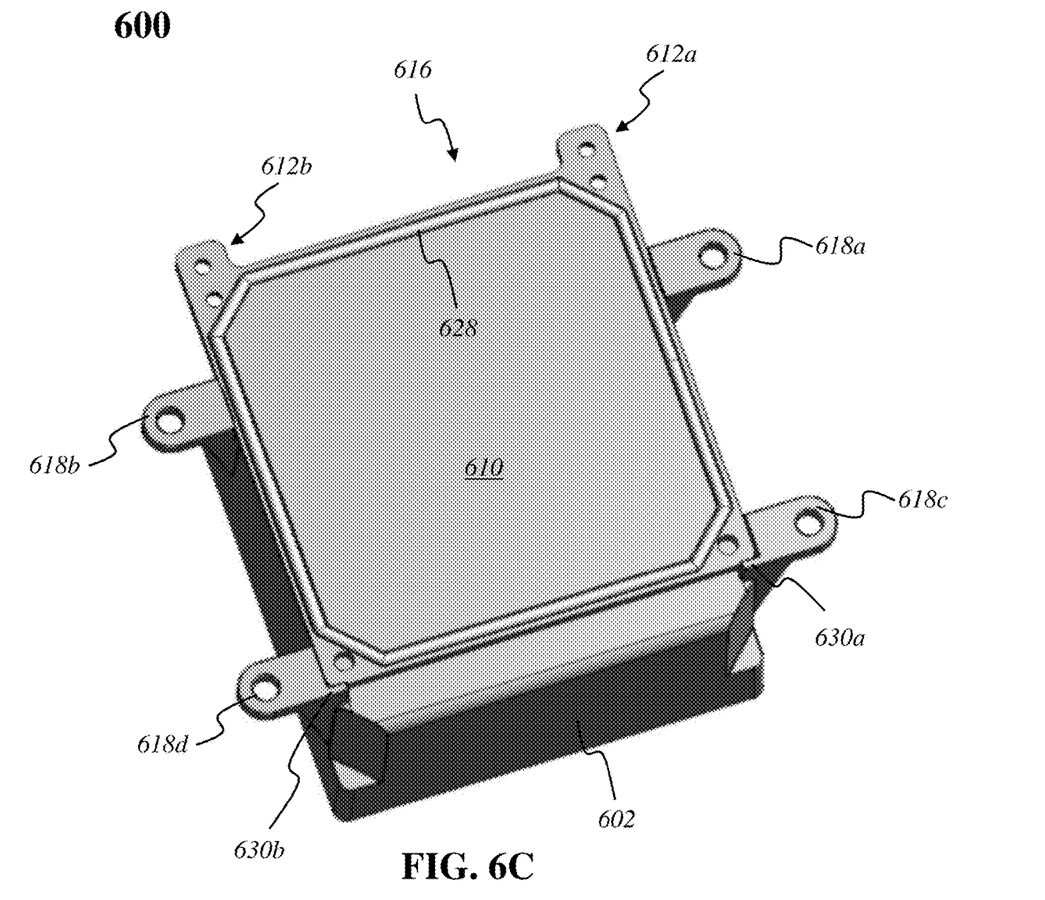

FIGS. 6A-6C are representative drawings of a junction box assembly 600, according to exemplary embodiments. FIG. 6A is a front perspective view of the junction box assembly 600; FIG. 6B is a front perspective view of the junction box assembly with the cover screwed into the front of the box; and FIG. 6C is a back perspective view of the junction box assembly with the cover placed in the dedicated slot.

The junction box assembly 600 includes many of the features of the junction box assemblies 100 and 400. A junction box 602 includes an opening 604 that enables access to contents such as wires, cables, and/or terminals to be joined within the junction box assembly 600. A cover 610 is used to create a closed structure for housing the contents within the junction box 602. In exemplary embodiments, the cover 610 is removable from a slot 616 to be placed over the opening 604 of the junction box 602 once the contents inside the junction box have been secured.

A raised perimeter edge portion 606 surrounds the opening 604 of the junction box 602 and is adjacent to threaded bores 608a-d disposed at corners of the junction box (collectively, "threaded bores 608"). In exemplary embodiments, the raised perimeter edge portion 606 has a predefined shape designed to receive a similarly shaped element of the cover 610 to both align and mate the junction box 602 with the cover, thus forming a tight seal therebetween.

The threaded bores 608 are sized to receive captive screws 626a-d of the cover 610 (collectively, "captive screws 626"). Protrusions 612a-b are disposed at one end of the cover 610 (collectively, "protrusions 112"). In FIG. 6B, the cover 610 has been removed from the slot 616, with the captive screws 626a and 626b remaining in respective screw holes 614c and 614d but now screwed into the front of the junction box 602. The captive screws 626c and 626d, which were previously inserted into respective screw holes 614a and 614b, are now inserted into respective screw holes 608c and 608d in the bottom of the cover 610.

As shown, the distance between screw holes 608a and 608b is $l_5$, while the distance between screw holes 608a and 608c is $l_6$. In exemplary embodiments, the distance, $l_5$, is the same as the distance, $l_6$, or $l_5=l_6$. This means that the cover 610 can be secured in an upright position, rotated right 90°, rotated left 90°, or inserted upside down.

In exemplary embodiments, the junction box assembly 600 includes mounting feet 618a-618d (collectively, "mounting feet 618"). Callouts for a box attach portion 620, a surface attach portion 622, and an aperture 624 are given for mounting foot 618b, although these features are also present in mounting feet 618a, 618c, and 618d. As best viewed in FIG. 6C, the mounting feet 618a and 618b are different from mounting feet 618c and 618d, in that the latter two mounting feet additionally include respective platforms 630a and 630b (collectively, "platforms 630"). The platforms 630 provide a shelf for holding the cover 610 in place as it is inserted into the slot 616. Put another way, the platforms 630 provide a stopping point for the cover 610 as it is inserted into the slot 616. An integrated gasket 628 is also shown in the back view of FIG. 6C. The integrated gasket 628 is shaped to fit with the perimeter edge portion 606 of the junction box shown in FIG. 6A.

The junction box assemblies 100, 400, and 600 thus provide a simple and practical approach to ensuring that the traditionally loose elements, such as the cover, screws, and gaskets, are not lost during installation operations which may take weeks to complete. Two of the captive screws are already in position for attachment of the cover to the junction box so they can be tightened without removal, eliminating the potential for loss. The movable captive screws are provisionally set within dedicated screw holes of the cover and do not become loose. With the help of a screwdriver, the captive screws are moved to screw holes after the cover is removed from the slot and disposed over the opening of the junction box. The perimeter edge portion of the junction box and the gasket groove of the cover ensures effortless placement of the cover over the junction box. The integrated gasket, which may be integrated to either the perimeter edge portion of the junction box or to the gasket groove of the cover, ensures that a component providing air- and/or water-tight seal of the junction box assembly is not lost. The slot that provides a temporary location for the cover provides a dual benefit of providing ventilation between the junction box assembly and the mounting surface once the cover is screwed into the junction box. With increased airflow and minimal contact with metal supports or siding, the junction box assembly 100/400/600 remains cooler and less susceptible to heat induced warpage, in exemplary embodiments, thus extending its life and reducing maintenance. In exemplary embodiments, the cost of the junction box assembly 100/400/600 is comparable to a standard junction box.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A junction box assembly, comprising:
   a cover comprising a first captive screw disposed in a first screw hole and a second captive screw disposed in a second screw hole;
   a junction box having an opening on a first side, said opening for receiving electrical components therein, the junction box having a second side opposite the first side, the second side comprising a slot to temporarily store the cover; and
   a first mounting foot and a second mounting foot, wherein the slot is formed in the first mounting foot and the second mounting foot.

2. The junction box assembly of claim 1, the junction box further comprising a perimeter edge portion on the first side, the perimeter edge portion having a predefined shape.

3. The junction box assembly of claim 2, the cover further comprising a gasket groove having a shape corresponding to the predefined shape of the perimeter edge portion, wherein the cover is matable with the junction box by aligning the gasket groove with the perimeter edge portion.

4. The junction box assembly of claim 1, the cover further comprising a third captive screw disposed in a third screw hole and a fourth captive screw disposed in a fourth screw hole.

5. The junction box assembly of claim 4, wherein the cover is matable with the junction box without removing the first captive screw from the first screw hole and without removing the second captive screw from the second screw hole.

6. The junction box assembly of claim 5, the junction box further comprising a first threaded bore, a second threaded bore, a third threaded bore, and a fourth threaded bore.

7. The junction box assembly of claim 6, wherein the first captive screw is inserted into the first threaded bore and the second captive screw is inserted into the second threaded bore.

8. The junction box assembly of claim 6, wherein the third captive screw is removed from the third screw hole and inserted into a fifth screw hole and the fourth captive screw is removed from the fourth screw hole and inserted into a sixth screw hole.

9. The junction box assembly of claim 8, wherein the third captive screw is inserted into the third threaded bore and the fourth captive screw is inserted into the fourth threaded bore.

10. The junction box assembly of claim 1, the first mounting foot comprising a first aperture and the second mounting foot comprising a second aperture, wherein the junction box is mountable to a surface by inserting a first fastener through the first aperture and inserting a second fastener through the second aperture.

11. A junction box assembly, comprising:
    a junction box comprising:
       a set of sidewalls defining a cavity;
       a first mounting foot extending from the set of sidewalls, the first mounting foot comprising a first groove;
       a second mounting foot extending from the set of sidewalls, the second mounting foot comprising a second groove; and
    a cover to be temporarily disposed between seated in the first groove and the second groove, the cover further comprising:
       a first pair of captive screws removable during attachment of the cover to the junction box; and
       a second pair of captive screws wherein the second pair of captive screws are not removed during attachment of the cover to the junction box.

12. The junction box assembly of claim 11, the junction box further comprising a first pair of threaded bores and a second pair of threaded bores.

13. The junction box assembly of claim 12, wherein the first pair of captive screws are insertable into the second pair of threaded bores.

14. The junction box assembly of claim 12, wherein the second pair of captive screws are insertable into the first pair of threaded bores.

15. A junction box assembly, comprising:
    a cover comprising a gasket groove of a predefined shape; and
    a junction box comprising:
       a slot disposed between formed in each foot of a pair of mounting feet, the slots to temporarily store the cover; and
       a perimeter edge portion having a shape corresponding to the predefined shape, wherein the gasket groove mates with the perimeter edge portion.

16. The junction box assembly of claim 15, further comprising an integrated gasket of the predefined shape.

17. The junction box assembly of claim 16, wherein the integrated gasket is disposed in the perimeter edge portion.

18. The junction box assembly of claim 16, wherein the integrated gasket is disposed in the gasket groove.

19. The junction box assembly of claim 15, the junction box further comprising a pair of support feet, wherein the cover is seated on the pair of support feet during temporary storage.

* * * * *